May 15, 1951          E. R. BAIN          2,552,759
REEL OVEN LOADING AND DISCHARGING DEVICE
Filed Jan. 28, 1946          2 Sheets-Sheet 1
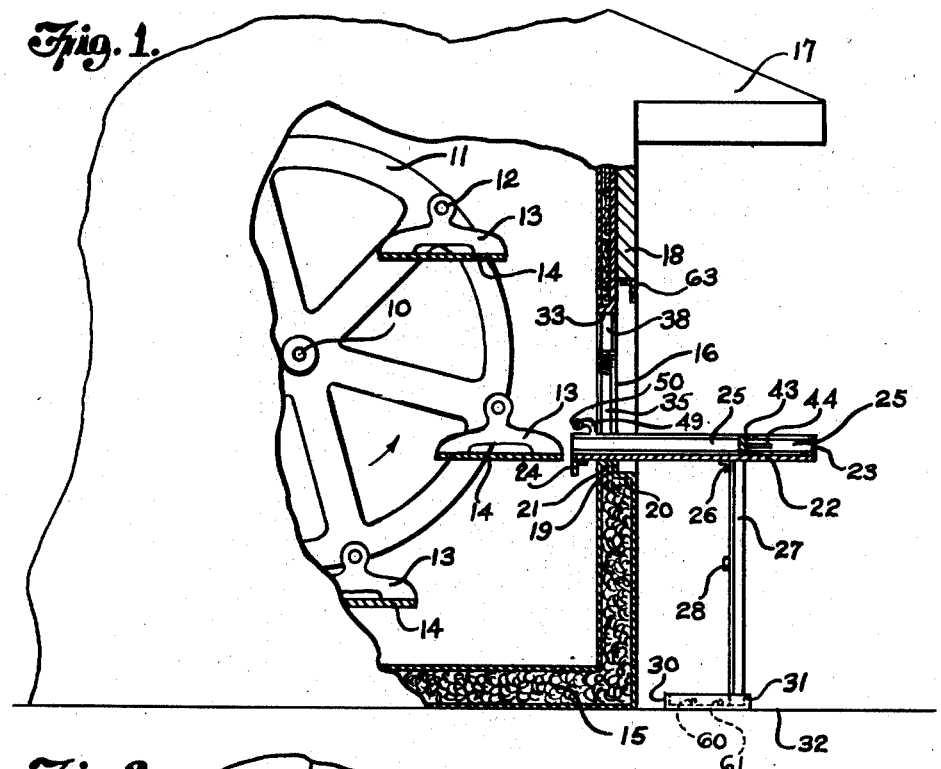
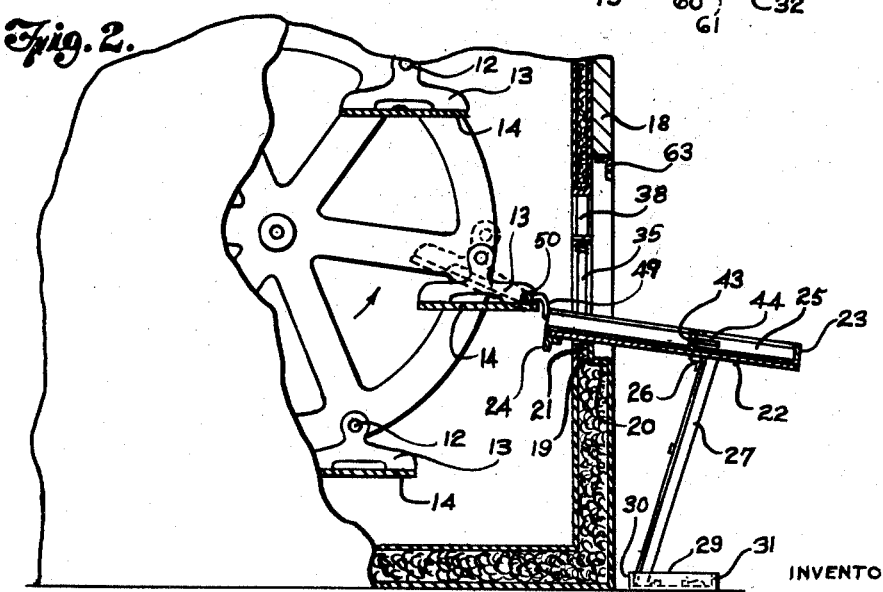
INVENTOR
EARL R. BAIN
BY Alfred R. Fuchs
ATTORNEY

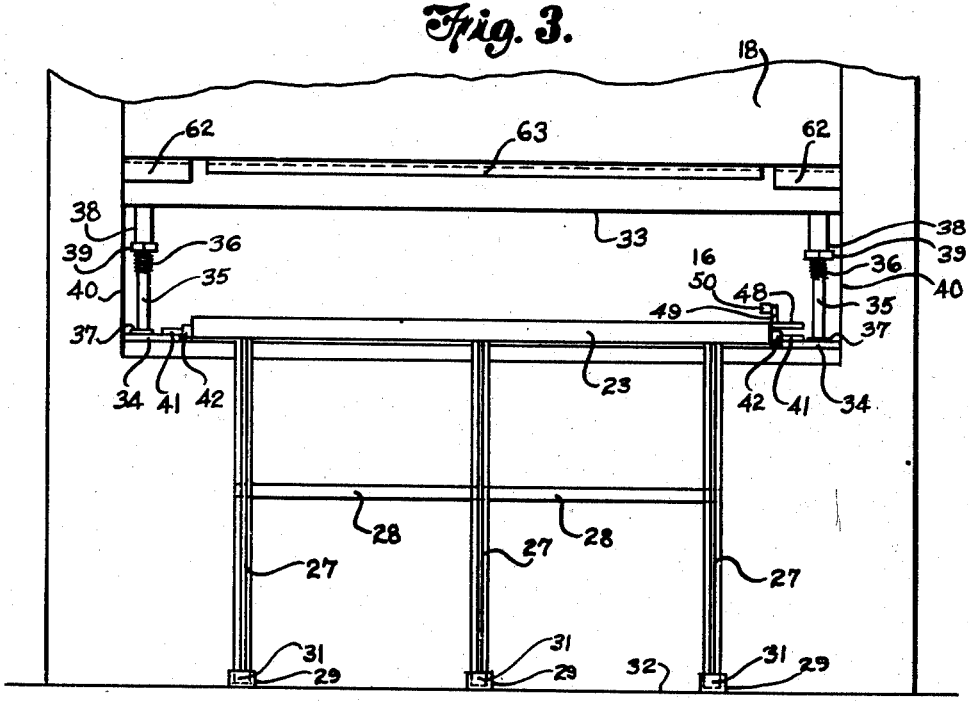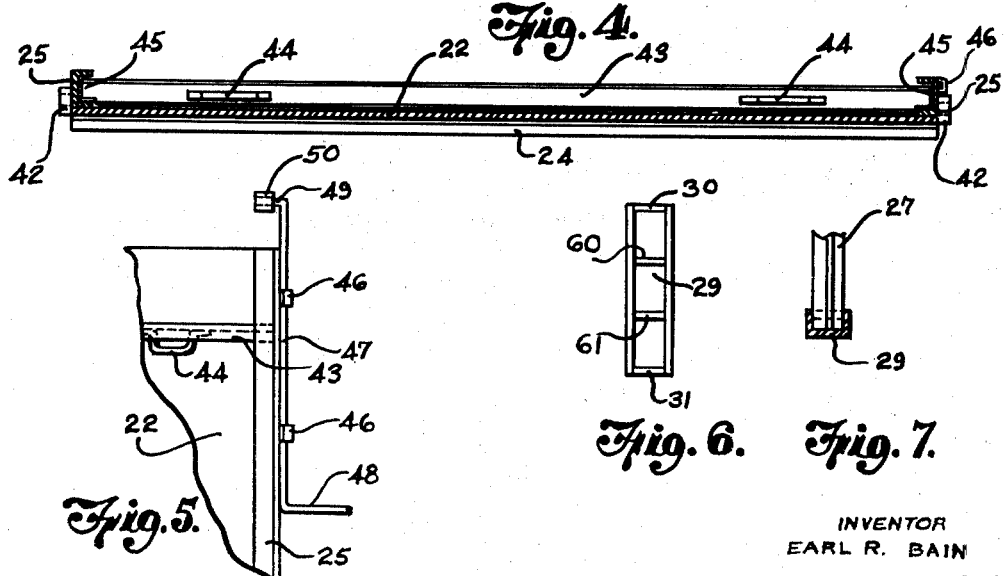

Patented May 15, 1951

2,552,759

UNITED STATES PATENT OFFICE 2,552,759

REEL OVEN LOADING AND DISCHARGING DEVICE

Earl R. Bain, Chanute, Kans., assignor of one-half to Vance D. Gill, Kansas City, Mo.

Application January 28, 1946, Serial No. 643,882

9 Claims. (Cl. 107—59)

1

My invention relates to reel ovens, and more particularly to loading and discharging devices for reel ovens.

It is a purpose of my invention to provide a faster and easier means of loading and unloading a reel type baker's oven.

It is a further purpose of my invention to provide a loading and unloading device for an oven of the above mentioned character that is adapted to produce greater uniformity in the baking of the product that is baked in said oven, this being due to the fact that all of the contents of one shelf can be loaded thereon at one time and discharged therefrom at one time.

It is a further purpose of my invention to provide a loading and unloading device of the above mentioned character that is simple in construction and which can be applied to any reel oven and which saves much time and labor in the loading and unloading of the oven.

It is a further purpose of my invention to provide a new and improved means of loading and unloading the shelves of a reel oven whereby the operator of the oven who loads and unloads the same avoids the extreme heat that is present adjacent the door of the oven, by placing the operator back of the main heat area adjacent the door of the oven.

It is a particular purpose of my invention to provide a receiving table that is adapted to assume a plurality of positions, one for feeding the product to be baked from said table onto the shelves of the reel oven, and the other for receiving the products that have been baked from the shelves of the reel oven.

It is a further purpose of my invention to provide a device of the above mentioned character, which is provided with adjustable means for tilting each of the tiltable shelves of the reel oven when this is desired, to discharge the products from said shelf onto said receiving table. A further advantage of my invention is that when the bread or other product that has been baked, which is contained in pans, is discharged onto the receiving table the pans will engage an abutment which will cause the bread or other product to be jarred in the pans so as to release the bread or similar baked product from the pans and make it easier to remove the same from the pans.

Other objects and advantages of my invention will appear as the description of the drawings proceeds. I desire to have it understood, however, that I do not intend to limit myself to the particular details shown or described, except as defined in the claims.

2

In the drawings:

Fig. 1 is a fragmentary view of a reel oven partly broken away to show portions thereof in vertical section, showing my improved loading and unloading device applied thereto in the position it assumes for loading the oven.

Fig. 2 is a fragmentary view of a reel oven partly broken away to show portions thereof in vertical section, showing my improved loading and unloading device in discharging position.

Fig. 3 is a fragmentary front elevational view of a reel oven, showing my improved loading and unloading device in elevation.

Fig. 4 is a vertical transverse sectional view through the receiving table of my loading and unloading device.

Fig. 5 is a fragmentary top plan view of the receiving table, showing the shelf tipping means provided thereon, but omitting the mounting means therefor.

Fig. 6 is a top plan view of the socket member adjustably receiving the bottom end of the table supporting legs, and Fig. 7 is a fragmentary elevational view of the bottom end portion of one of said legs mounted in one of said socket members, which socket member is shown in section.

Referring in detail to the drawings, my improved loading and discharging device is shown as being applied to an oven that has a reel having a shaft 10 and having a pair of end members 11 mounted on said shaft to rotate therewith, said shaft being driven by any suitable means at a predetermined rate of speed. On said reel portion are pivots 12 for mounting the brackets 13, which carry the shelves 14, upon which the products to be baked are placed, preferably, in pans. Said oven is provided in the bottom portion thereof with suitable heating means, preferably, in the form of gas burners, which are not shown, and is provided with insulated walls 15, one of which is provided with an opening 16 through which the oven is loaded and discharged. A canopy 17 projects from the front of the oven above the opening 16 so that the hot gases escaping through the opening 16 when the door 18 is in open position will be drawn out through suitable ventilating means provided in said canopy. Ordinarily if a person is standing close to the front wall of the oven adjacent the opening 16, he is in the path of the gases passing from the interior of the oven through the opening 16 toward the canopy 17.

The opening 16 is provided with marginal walls having offsets 19 therein so as to provide a seat for the door 18 when it is in closing position to shut off the discharge of hot gases around said door. The bottom marginal wall of the opening thus has a lower ledge 20 and an upper ledge 21.

My improved loading and discharging device comprises a table having a flat top wall 22, which is reinforced along the margins thereof, the same being elongated in the direction of length of the opening 16 and having an upstanding angle iron reinforcement 23 along its outer side edge, which also serves as a stop means, as will be described below. The angle iron member 23 may be welded or in any other manner fixedly secured to the wall 22. The inner side of the wall 22 is provided with a depending angular reinforcing member 24 and the opposite end margins of said wall 22 are provided with channel members 25, which are fixed thereto by welding or otherwise, and which also serve as guide members, as will be pointed out below. The under side of the wall 22 is provided with a plurality of hinges 26, by means of which the legs 27 are hingedly secured to said wall 22.

The legs 27 are, preferably, T-shaped in cross section, as will be obvious from Figs. 1, 2 and 7 and are secured together so as to swing about the pivots of the hinges 26 as a unit by means of a cross member 28 secured to said members 27 in fixed position by welding, riveting or otherwise. The lower ends of the legs 27 are mounted in short channeled guide members 29. Said guide members 29 are provided with end walls 30 and 31, and with cross ribs 60 and 61, as will be obvious from Fig. 6. The ribs 60 and 61 are considerably shorter than the end walls 30 and 31. Said guide members are fixed in position on any suitable supporting surface, such as that indicated at 32 in Figs. 1, 2 and 3, and the legs are adapted to assume a position between the end wall 31 and rib 61, or between the end wall 30 and rib 60, or between the ribs 60 and 61, as may be desirable, thus providing three positions for the legs 27. When the legs are in engagement with the end walls 31 said legs 27 are in a vertical position and the wall 22 is in a horizontal position, the table thus being in a horizontal position as shown in Fig. 1. When the legs 27 are in engagement with the end walls 30 then the wall 22 is in the inclined position shown in Fig. 2, or it may be placed in a less inclined position by placing the legs between the ribs 60 and 61, the table being suitably pivotally mounted so as to assume these various positions, as will be described below.

The pivotal mounting for the table may be of a permanent character or may be of a detachable character. In order to apply the invention to reel ovens already in use a detachable pivotal mounting for the table is shown comprising clamping means adapted to be engaged between the ledge 21 and the top wall portion 33 of the opening 16 out of the way of the door 18. Said pivotal mounting, preferably, comprises a plate-like member 34, which is adapted to seat on the ledge 21 and to which is fixedly secured, as by welding, a rod-like member 35, which is provided with a screw-threaded upper end portion 36. The rod-like member 35 may be made in the form of a bolt having its head 37 welded onto the plate-like member 34. A tubular member 38, which may be a short piece of pipe, has a nut 39 welded onto the one end thereof, with which the threaded portion 36 of the rod-like member 35 engages. It will be obvious that by adjusting the member 38 on the member 35 by means of the threaded connection thus provided, the plate 34 can be clamped against the ledge 21 and the end of the pipe 38 against the top wall 33. The plates 34 are so located that the end edges thereof will engage the end walls 40 of the opening 16 for the door.

Fixed on the plates 34 are pivot members 41, which are pivotally mounted in suitable pivot openings in bosses 42, which bosses are provided on the channel members 25. The pivot members 41 are located adjacent the bottom of the wall 22 so as to permit tilting of the table from the position shown in Fig. 1 to that shown in Fig. 2 about the edge portion of the offset connecting the ledges 21 and 20.

A pusher member 43 made in the form of a channel member having a pair of handles 44 projecting rearwardly therefrom is slidably mounted between the flanges of the channel members 25, said member 43 having a reduced end portion 45 for slidably mounting the same between the flanges of said channel members. With the parts in the position shown in Fig. 1 the pusher member 43 can be moved from a position adjacent the outer side wall 23 or any desired intermediate position suitable for the purpose described below, to move objects mounted on the top of the wall 22 of the table toward the left onto a shelf 14, in such a position that it will receive the objects pushed off the inner side of the table member. Preferably, sufficient pans of a product, such as bread, to be baked on a shelf 14 are placed on the table on said flat wall 22 at the left of the pusher member 43 as viewed in Fig. 1, to fill one of said shelves and said pusher member 43 is then actuated to push the pans onto the shelf 14 filling the same. The reel is then rotated in the direction of the arrow to bring the next shelf 14 into position and this is repeated.

Slidably mounted in suitable brackets 46 provided on the one end member 25 is a bar 47, which is provided with an angular end portion 48 providing a handle, and with an upwardly and inwardly bent end portion 49 having a roller 50 or other enlargement thereon, which is adapted to engage a shelf when projected into the path of the same as shown in Fig. 2, by means of the handle 48, to cause a shelf 14 to be tilted toward the dotted line position shown in Fig. 2 as the same is moved upwardly as said reel rotates in the direction of the arrow on Fig. 2. Such tilting of the shelf 14 will cause the pans thereon to slide onto the table having the wall 22 if the same has been adjusted to the position shown in Fig. 2, the pans sliding down the inclined surface of the table and sliding the bar 43 until it engages the angle member 23, if not previously moved back against the same, said member 23 serving as a stop member to suddenly stop the sliding movement of the pans, causing a jar of all of the pans that were discharged from the shelf 14, which releases the bread from the walls of the pans. Because of the fact that the discharging means can be operated without standing close to the oven front and the pusher member can be utilized to quickly move a shelfful of pans onto a shelf 14, the operator that is either loading or discharging the oven can keep out of the path of the hot gases passing from the opening 16 to the canopy 17.

The roller 50 can either be left in the position shown in Fig. 2 to successively discharge the shelves 14 as they reach the position shown in Fig. 2, if the bread in the pans on the receiving table can be removed quickly enough to do this without stopping the reel, or the reel can be stopped each time that one of the shelves reaches the position shown in Fig. 2, and started again when the receiving table has been cleared.

It will be seen from the above that a table member is provided which is adapted to be located in a position that is substantially horizontal so as to be used for feeding or loading the shelves of a reel oven, or in an inclined position with the lowermost side thereof remote from the oven so as permit the bread or other product on the shelves to be discharged from the shelves of the reel by gravity, and that the entire apparatus is of a simple character and can be very readily mounted in an oven of the general type shown, due to the detachable mounting means provided therefor.

In order to close the door opening 16 by means of the door 18 with my apparatus in place, extensions 62 fitting between the tiltable table member and the side walls of said opening and an extension 63 fitting between the channel members 25 are provided on said door.

What I claim is:

1. The combination with a bake oven having a reel therein provided with pivoted shelves and having an opening therein through which products to be baked are loaded onto and removed from said shelves, of a table projecting through said opening into proximity to said reel, means for mounting said table so that the same may be adjusted to an inclined position or to a substantially horizontal position, and means for tilting a shelf when in proximity to said table.

2. The combination with a bake oven having a reel therein provided with pivoted shelves and having an opening therein through which products to be baked are loaded onto and removed from said shelves, of a table projecting through said opening into proximity to said reel, means for mounting said table so that the same may be adjusted to an inclined position or to a substantially horizontal position, and shelf tilting means projectable into the path of said shelves in proximity to said table.

3. The combination with a bake oven having a reel therein provided with pivoted shelves and having an opening therein through which products to be baked are loaded onto and removed from said shelves, of a table projecting through said opening into proximity to said reel, means for mounting said table so that the same may be adjusted to an inclined position or to a substantially horizontal position, and a pusher member mounted solely on said table to slide over the top thereof.

4. The combination with a bake oven having a reel therein provided with pivoted shelves and having an opening therein substantially in horizontal alignment with the axis of rotation of said reel through which products to be baked are loaded onto and removed from said shelves, the lower margin of said opening being below said axis, of a table projecting through said opening with its inner edge in proximity to said reel but out of the path of said shelves and means for mounting said table so that the same may be adjusted to an inclined position with its inner edge below said axis of rotation or to a substantially horizontal position with its inner edge below said axis of rotation, the outer edge of said table having a stop flange thereon.

5. The combination with a bake oven having a reel therein provided with pivoted shelves and having an opening therein substantially in horizontal alignment with the axis of rotation of said reel through which products to be baked are loaded onto and removed from said shelves, the lower margin of said opening being below said axis, of a table mounted in said opening to tilt about a horizontal axis near the inner edge of said table and projecting inwardly from said mounting with its inner edge in proximity to said reel but out of the path of said shelves and outwardly from said mounting to locate the major portion thereof outside said oven in all positions thereof, and supporting means for said table externally forwardly of said oven adjustable to either support said table in a substantially horizontal position with its inner edge below said axis of rotation or in an outwardly downwardly inclined position with its inner edge below said axis of rotation, said table having a stop flange at its outer edge.

6. The combination with a bake oven having a reel therein provided with pivoted shelves and having an opening therein through which products to be baked are loaded onto and removed from said shelves, of a table mounted in said opening to tilt about a fixed horizontal axis located in said opening and projecting inwardly from said mounting into proximity to said reel and outwardly from said mounting to locate the major portion thereof outside said oven, legs pivotally connected with said table externally of said oven at the upper ends thereof and an adjustable mounting for said legs at the lower ends thereof for holding the same in either of two alternative positions to either support said table in a substantially horizontal position or in an inclined position.

7. The combination with a bake oven having a reel therein provided with pivoted shelves and having an opening therein through which products to be baked are loaded onto and removed from said shelves, of a table projecting through said opening into proximity to said reel, means for mounting said table so that the same may be adjusted to an inclined position or to a substantially horizontal position, a shiftable member mounted on said table for guided inward and outward movement thereon, a shelf tilting member mounted on said shiftable member and means thereon for moving said shiftable member to project said tilting member into the path of said shelves or retract the same out of said path.

8. The combination with a bake oven having a reel therein provided with pivoted shelves and having an opening therein through which products to be baked are loaded onto and removed from said shelves, of a table, means detachably mounted in said opening for pivotally mounting said table to tilt about a horizontal axis, said table projecting inwardly from said mounting into proximity to said reel and outwardly from said mounting to locate the major portion thereof outside said oven, and supporting means for said table externally of said oven adjustable to either support said table in a substantially horizontal position or in an inclined position, said detachable mounting means comprising plate-like members having screw-threaded members projecting upwardly therefrom, cooperating screw-threaded members for clamping said mounting means in said opening, and aligned horizontally extending pivots on said plate-like members pivotally supporting said table.

9. The combination with a bake oven having a reel therein provided with pivoted shelves and having an opening therein through which products to be baked are loaded onto and removed from said shelves, of a table projecting through said opening into proximity to said reel, means for mounting said table so that the same may be adjusted to an inclined position or to a substantially horizontal position, said table having a stop flange along its outer margin, and having channeled guide members along its end edges, a pusher bar having its ends engaging said guide members and slidable along the top surface of said table, and a pair of handle members on said bar.

EARL R. BAIN.

REFERENCES CITED

The following references are of record in the file of this patent:

UNITED STATES PATENTS

| Number | Name | Date |
|---|---|---|
| 846,046 | Nasmith | Mar. 5, 1907 |
| 1,555,116 | Harber | Sept. 29, 1925 |
| 1,603,333 | Elliott | Oct. 19, 1926 |
| 1,604,348 | Harber | Oct. 26, 1926 |
| 1,769,201 | Brandeen | July 1, 1930 |
| 1,838,395 | Hatch | Dec. 29, 1931 |
| 2,350,067 | Roberts et al. | May 30, 1944 |

FOREIGN PATENTS

| Number | Country | Date |
|---|---|---|
| 12,626 | Great Britain | May 22, 1914 |